United States Patent [19]

Herron

[11] Patent Number: 4,681,547

[45] Date of Patent: Jul. 21, 1987

[54] CERVICAL EXAM TEACHING METHOD

[76] Inventor: Marie Herron, 2300 Webster, #502, San Francisco, Calif. 94115

[21] Appl. No.: 805,615

[22] Filed: Dec. 6, 1985

[51] Int. Cl.⁴ ............................................ G09B 23/30
[52] U.S. Cl. .................................................... 434/273
[58] Field of Search .............. 434/187, 219, 262, 263, 434/266, 267, 273, 365, 366, 367

[56] References Cited

U.S. PATENT DOCUMENTS

| | | | |
|---|---|---|---|
| 2,132,226 | 10/1938 | Wahlberg | 434/273 |
| 3,921,311 | 11/1975 | Beasley | 434/273 |
| 4,309,111 | 1/1982 | Sobresky | 434/367 |
| 4,494,936 | 1/1985 | Stickles | 434/273 |

FOREIGN PATENT DOCUMENTS 2612898  9/1977  Fed. Rep. of Germany ...... 434/273

OTHER PUBLICATIONS

J. A. Broadston, "Surface Roughness Standards For Tactual Comparisons", pp. 756–759 of Nov. 1944, Issue of Product Engineering.

*Primary Examiner*—William H. Grieb
*Attorney, Agent, or Firm*—Flehr, Hohbach, Test, Albritton & Herbert

[57] ABSTRACT

A cervical exam teaching tool which provides a multiplicity of realistic models of a woman's cervix prior to or during a phase of preterm labor. In the preferred embodiments, the cervical models are arranged in rows, with each row of models simulating the change in either one cervical parameter or in a set or related parameters. By learning to feel the differences between cervical models, a person will learn to detect the critical cervical changes associated with preterm labor.

5 Claims, 2 Drawing Figures

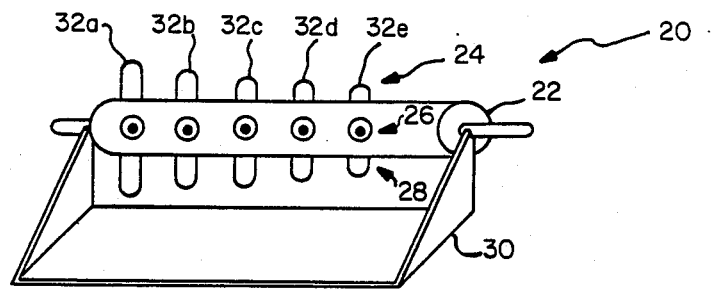
FIG. — 1
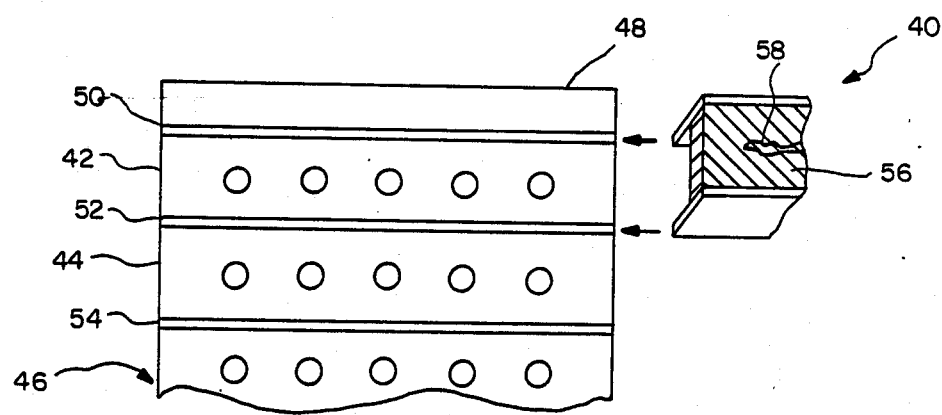
FIG. — 2

CERVICAL EXAM TEACHING METHOD

The present invention relates generally to physiological or anatomical models, and particularly to a functionally realistic set of models of the human female cervix.

BACKGROUND OF THE INVENTION

The prior art includes clinical demonstration models of the human female pelvic region. See for example U.S. Pat. Nos. 2,132,226 and 3,921,311. The aforementioned prior art does not provide a teaching tool for learning to detect different stages of preterm labor by manual, non-visual inspection of the cervix.

Cervical changes associated with preterm labor are often very subtle and thus difficult to detect without sufficient practice in evaluating these changes through manual, non-visual inspection. The consequences of insufficient training are that preterm labor may not be treated soon enough to prevent preterm birth. Properly trained personnel can detect these changes early in the onset of preterm labor, whereby proper medical treatment can be initiated to prevent preterm birth.

This invention allows doctors and nurses to educate themselves about the subtle cervical changes associated with preterm labor. Because of the location of the cervix, such cervical changes cannot normally be seen and must be detected by manually feeling the cervix. Due to the subtle nature of the cervical changes, detection skills cannot be effectively taught through the use of pictures. Proper training requires the development of manual skills, which requires repeated practice. The inventor has found that the obvious restraints on the practicality of practicing on live patients inhibits effective training. The present invention provides a cervical exam training tool which overcomes the problems associated with prior teaching methods.

The present invention also allows doctors and nurses to educate their patients about the cervical changes that may occur prior to and during preterm labor through the visualization of the cervical models used in the invention.

Another shortcoming of the prior art is that prior art physiological or anatomical models generally include only a single model of the cervix. A multiplicity of models is needed, however, to simulate the cervical changes associated with preterm labor.

It is therefore a primary object of the present invention to provide an improved cervical exam teaching tool.

SUMMARY OF THE INVENTION

In summary, the present invention is a cervical exam teaching tool which provides a multiplicity of realistic models of a woman's cervix as it may change as a result of preterm labor. In the preferred embodiments, the cervical models are arranged in rows, with each row of models simulating the change in either one cervical parameter or in a set of related parameters. By learning to feel the differences between cervical models, a person will learn to detect the critical cervical changes associated with preterm labor.

BRIEF DESCRIPTION OF THE DRAWINGS

Additional objects and features of the invention will be more readily apparent from the following detailed description and appended claims when taken in conjunction with the drawings, in which:

FIG. 1 schematically depicts a first preferred embodiment of the present invention.

FIG. 2 schematically depicts another preferred embodiment of the present invention.

DESCRIPTION OF THE PREFERRED EMBODIMENTS

Referring to FIG. 1, there is shown a first preferred embodiment of a cervical exam teaching tool 20. The tool 20 includes a roller 22 on which several sets of cervical models 24, 26, 28 are mounted. The roller 22 is mounted on a stand 30.

In this preferred embodiment, four sets of cervical models are mounted on the tool 20. Three sets 24, 26, 28 are shown in FIG. 1, and a fourth is on the back side of the roller 22.

Each cervical model, such as model 32a, is a realistic model which simulates the shape and feel of a woman's cervix prior to or during a phase of preterm labor.

Each set or row of cervical models simulates the change in at least one cervical characteristic which may occur during preterm labor. Thus set 24 simulates the change in cervical length with all models in the set having no cervical dilation and a firm cervical consistency; set 26 simulates the change in cervical length with all models in the set having a cervical dilation of one centimeter and firm consistency; and set 28 simulated the change in cervical length with all models in the set having no cervical dilation and a soft cervical consistency. The fourth set on the back side of the roller and therefore not shown in FIG. 1 simulates the change in cervical length with all models in the set having a cervical dilation of one centimeter and a soft cervical consistency.

In the preferred embodiments the changed in three cervical characteristics are simulated: cervical length, cervical dilation, and cervical firmness or consistency. The cervical lengths in the models range from 0.5 centimeters to 2 centimeters. Thus the models 32a–32e in row 24 have the following cervical lengths: 2, 1.75, 1.5, 1.0, and 0.5 centimeters, respectively.

The cervical dilation in the models ranges is either a pinhole (less than 0.1 centimeters) for a closed cervix or a 1.0 centimeter opening for a partially dilated cervix. In an alternate embodiment of the invention, the teaching tool 20 could provide a set of models in which a gradual change in the cervical dilation from closed to partially open is simulated.

The cervix usually softens prior to the onset of either preterm or term labor. In a primigravida, first pregnancy and labor, the cervix usually softens first, then shortens in length and finally dilates. In a multigravida, second or later pregnancy and labor, the cervix usually softens first, then shortens in length and dilates at the same time.

Cervical consistency changes from a firm consistency which feels somewhat like the tip of one's nose to a soft consistency which may feel like jelly. In the preferred embodiment, the cervical firmness in the models is either firm or soft. These different firmness levels are achieved by altering the components of silicon used in the models.

In an alternate embodiment of the invention three or more levels of cervical firmness could be provided to simulate the process of cervical softening. In another alternate embodiment of the invention, one or more sets of models could be provide which simulate first the softening of the cervix, then the shortening of the cervix, and finally the dilation of the cervix, so as to provide a single row of models which simulate the sequence of cervical changes which typically occurs in a primigravida. In yet another alternate embodiment of the invention, one or more rows of models could be provided which simulate the simultaneous change in cervical length and dilation which typically occurs in a multigravida.

With respect to the mechanical features of the first preferred embodiment, the stand 30 is fourteen and one-quarter inches long and five inches high. The roller 22 fits snugly in the frame 30 and is 2.25 inches in diameter.

Referring to FIG. 2, in the second preferred embodiment 40 the cervical models are mounted in a multiplicity of rows 42-46 on a flat board 48. The board 48 includes tracks 50-54 for receiving an apron or covering member 56 which covers the models in a selected row. A slit 58 in the apron 56 permits entry of a person's hand for manually inspecting the models, but prevents visual inspection, thereby aiding the development of manual inspection skills.

As will be understood by those skilled in the art, the apron 56 of the second preferred embodiment could be replaced by any number of equivalent mechanisms. Similar mechanisms could also be added to the first preferred embodiment.

In particular, the apron means 56 can comprise a model of a vagina which can be coupled to the teaching tool 40 over selected cervix models, thereby providing a realistic anatomical model for cervical inspection.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For instance, instead of arranging the cervical models in a series of parallel rows the models could be organized in a different type of matrix, such as a star pattern with each radial arm simulating a different preterm labor sequence. In general, adjacent models in the matrix will differ in at least one cervical characteristic so that the progression from one to the other simulates a cervical change associated with a preselected phase of preterm labor.

What is claimed is:

1. A method of teaching cervical examination for the detection of preterm labor, the steps of the method comprising:
   providing a multiplicity of models of the human female cervix;
   arranging said models in a plurality or rows so that the models in each row differ from one another in at least one cervical characteristic selected from a preselected set of cervical characteristics which change during the course of preterm labor, wherein the progression of said models in each row simulates the change in a different cervical characteristic or set of cervical characteristics during preterm labor; and
   repetitively touching the models in each said row to learn the feeling of each said cervical characteristic during preterm labor.

2. The method of claim 1, wherein said models in each said row simulate the monotonic change in at least one cervical characteristic selected from the set consisting of cervical length, cervical dilation and cervical firmness.

3. The method of claim 1, wherein said touching step includes the step of preventing visual inspection of said models while performing said touching step.

4. A method of teaching cervical examination for the detection of preterm labor, the steps of the method comprising:
   providing a multiplicity of models of the human female cervix, each said model corresponding to the shape and feel of a human female's cervix prior to or during a preselected phase of preterm labor; and
   arranging said models in a matrix so that adjacent models in said matrix differ in at least one cervical characteristic so that the progression from one to the other simulates a cervical change associated with a preselected phase of preterm labor, and the progression from a first preselected model in said matrix to each of at least two other models adjacent to said first model simulates the change in a different cervical characteristic or set of characteristics.

5. The method of claim 4, further including the step of touching the models in each said row to learn the feeling of each said cervical characteristic during preterm labor.

* * * * *